US009850566B2

(12) United States Patent
Zimmermann et al.

(10) Patent No.: US 9,850,566 B2
(45) Date of Patent: Dec. 26, 2017

(54) METHOD FOR COATING A COMPONENT OF A TURBOMACHINE AND COATED COMPONENT FOR A TURBOMACHINE

(71) Applicant: Ansaldo Energia IP UK Limited, London (GB)

(72) Inventors: Julien Rene Andre Zimmermann, Baden (CH); Alexander Stankowski, Wuerenlingen (CH); Piero-Daniele Grasso, Niederweningen (CH); Sven Olliges, Duebendorf (CH); Sophie Betty Claire Duval, Zürich (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 486 days.

(21) Appl. No.: 14/214,980

(22) Filed: Mar. 16, 2014

(65) Prior Publication Data

US 2014/0287149 A1 Sep. 25, 2014

(30) Foreign Application Priority Data

Mar. 19, 2013 (EP) .................................... 13160051

(51) Int. Cl.

| | |
|---|---|
| ***B05B 7/14*** | (2006.01) |
| ***B05B 7/20*** | (2006.01) |
| ***C23C 4/04*** | (2006.01) |
| ***C23C 4/12*** | (2016.01) |
| ***C23C 4/02*** | (2006.01) |
| *B32B 15/01* | (2006.01) |

(52) U.S. Cl.

CPC .................. *C23C 4/04* (2013.01); *B05B 7/14* (2013.01); *B05B 7/20* (2013.01); *C23C 4/02* (2013.01); *C23C 4/12* (2013.01)

(58) Field of Classification Search

CPC .................................. B05B 7/14; B05B 7/20

USPC ........................................................ 118/715

See application file for complete search history.

(56) References Cited

U.S. PATENT DOCUMENTS 5,705,231 A 1/1998 Nissley et al.
6,635,362 B2 10/2003 Zheng
2006/0233951 A1 * 10/2006 DeBiccari ............... C23C 24/04 427/180

(Continued)

FOREIGN PATENT DOCUMENTS

EP 1 396 556 3/2004
EP 1 712 657 10/2006

(Continued)

OTHER PUBLICATIONS

SprayWerx, "HVOF Torches", Jul. 8, 2012 Archival Record (https://web.archive.org/web/20120708081057/http://www.spraywerx.com/equipment/hvof-torches/k2-hvof).*

(Continued)

*Primary Examiner* — Humera Sheikh
*Assistant Examiner* — Lucas Wang
(74) *Attorney, Agent, or Firm* — Buchanan Ingersoll & Rooney PC

(57) ABSTRACT

The invention relates to a coating system for a component of a turbomachine, which includes at least two different base powders. Each of the at least two different base powders has an individual predetermined distribution within the coating system. Further, each of the at least two different base powders is responsible for a specific property of the coating system.

7 Claims, 4 Drawing Sheets

(56) References Cited

U.S. PATENT DOCUMENTS

| | | | | |
|---|---|---|---|---|
| 2009/0202814 | A1 | 8/2009 | Jabado et al. | |
| 2010/0330295 | A1 | 12/2010 | Hazel et al. | |
| 2012/0009432 | A1* | 1/2012 | Cox | C23C 4/08 428/552 |
| 2012/0128525 | A1 | 5/2012 | Kulkarni et al. | |
| 2012/0295825 | A1* | 11/2012 | Dorfman | C23C 4/04 508/151 |
| 2013/0078450 | A1* | 3/2013 | Jensen | B22F 3/115 428/327 |

FOREIGN PATENT DOCUMENTS

| | | |
|---|---|---|
| EP | 1 816 229 | 8/2007 |
| EP | 1 942 387 | 7/2008 |
| EP | 2 354 454 | 8/2011 |
| WO | 98/53940 | 12/1998 |
| WO | 02/40744 | 5/2002 |
| WO | 2011/094222 | 8/2011 |

OTHER PUBLICATIONS

Hasan et al., "Design and optimisation of a multi-powder feed system for the HVOF deposition process", Surface & Coating Technology, vol. 202, Dec. 8 2007, pp. 3215-3220.*

* cited by examiner

METHOD FOR COATING A COMPONENT OF A TURBOMACHINE AND COATED COMPONENT FOR A TURBOMACHINE

CROSS-REFERENCE TO RELATED APPLICATIONS

This application claims priority to European application 13160051.2 filed Mar. 19, 2013, the contents of which are hereby incorporated in its entirety.

TECHNICAL FIELD

The present invention relates to the technology of turbomachines, especially gas turbines. It refers to a method for coating a component of a turbomachine according to the preamble of claim 1.

It further refers to a coated component for a turbomachine.

BACKGROUND

The use of gas turbines (GTs) for electrical power generation can be very different in their working modus. GTs can be either used in order to produce a constant amount of electricity over a long period of time, as so-called "base loaders", or they can be used in order to level the differences between the electricity production of rather constant sources (Nuclear, GT base loaders etc.) with addition of the variations due to the increasing amount of non-constant renewable energy and the non-constant electricity demand. The second type of GT is a so-called "cyclic/peaker".

Within the lifetime of a GT it is possible that a "loader" becomes a "peaker". This change in working conditions leads to differences in solicitations and distress modes (i.e. boundary conditions) for the components in the turbine and especially the ones subjected to extreme temperature conditions. In the case of "loaders" they will need a larger creep and oxidation resistance, and in the case of "peakers" those component will need a better cycling resistance.

Furthermore, for each component, and locally on the component, the boundary conditions are different. Some areas are more prone to fatigue and some other areas to creep, oxidation/corrosion, erosion, etc. All those properties are strongly depending on a coating that is usually used to adapt the component to the actual operational boundary conditions. In order to answer the variations in properties needed it is therefore of strong interest to be able to produce coatings with flexibly and individually tailored properties.

Regarding ductility, an environmental coating can provide improved oxidation and corrosion resistance; however it can cause problems with the mechanical property of the parts due to the low ductility of those coatings, especially at low temperatures. One approach in order to improve the ductility of the coating is to obtain a predominantly gamma' structure that is modified with platinum group metal in order to avoid the formation of the beta nickel aluminide phase (brittle at low temperature), as it is explained in document US 2010/0330295 A1.

Another approach presented in document US 2012/0128525 A1, which also tries to optimize the composition of the bound coat, is trying to increase the gamma to gamma' transition temperature with the addition of Tantalum (preferentially without Re). Tantalum stabilizes the formation of a three phase system (beta/gamma/gamma') with a high gamma/gamma' transition temperature (higher than the coating service temperature) allowing to reduce the local stresses.

Document US 2010/0330295 A1 mentioned above also claims to provide a ductile coating in which a plurality of compositional gradient layers can be used to form the ductile and oxidation/corrosion resistant coating. In document EP 2 354 454 A1 it is claimed that in order to reduce the coating costs, a turbine blade could be coated at different locations with coatings having different oxidation resistance. The locations of the part with lower working temperature could be coated with a less oxidation resistant coating, and the hot spots with a more oxidation resistant coating. The second coating can be either another coating or a modification of the first one.

A metallic-ceramic material with gradient of ceramic concentration and oxidation protection element has also been proposed in document WO 98/53940 A1. The concentration of ceramic is increasing toward the surface of the material, giving a higher temperature and oxidation resistance close to the surface.

Two documents mention the use of reservoir phase including a core-shell structure. Document U.S. Pat. No. 6,635,362 B2 claims the addition of an aluminum-rich phase, which comprises a core containing aluminum and a shell comprising an aluminum diffusion-retarding composition. However, no oxide shell is mentioned. In another document, US 2009/0202814 A1, a reservoir phase is claimed where a core shell structure is used. The shell can consist of a metal oxide. The core can also be granularly designed.

In general, the use of separate powder feeders for each separate powder which can be of either homogeneous composition or a flexible composite powder, thermally sprayed simultaneously where the ratio of each powder can be changed online by changing the feeding rate have never been mentioned in the prior art.

Document EP 1 712 657 A2 discloses a cold spray method for sequentially depositing a first powder material and a second powder material onto a substrate at a velocity sufficient to deposit said materials by plastically deforming the material without metallurgically transforming the powder. It is described that such cold spray technology is also applicable when the powdered materials may be fed to the nozzle using modified thermal spray feeders. The main gas is heated to 315° C. to 677° C., preferably 385° C. to 482° C. to keep it from rapidly cooling and freezing once it expands past the nozzle. The net effect is a desirable surface temperature on the substrate.

Document U.S. Pat. No. 5,705,231 discloses a method of producing a segmented abradable ceramic coating system including a base coat foundation layer, a graded interlayer and an abradable top layer, where the interlayer is applied by a spray gun and comprises a compositional blend of the base coat foundation layer and the abradable top layer. The three layer approach provides a means of tailoring the long-term thermal insulation benefit provided by the initial layers and the abradability benefit provided by the top layer.

The current state of the art in terms of overlay coatings or bond coat is to use coatings with a given composition within a strict range. Therefore, when compositional changes need to be performed in order to locally vary the properties of a coating in the X-Y plane (i.e. in a different area on the component), or in Z direction (i.e. with the depth of the coating), several powder types are used, with different compositions and they are then sprayed in a stepwise manner, leading to multilayer coatings or the use of two distinct coatings (with different compositions) at two distinct locations.

The usual multilayer concept is leading to misfit and irregularities between the different coatings layers. Furthermore, if one or more of the layers are detached the coating loses the corresponding property.

The use of a modular composite coating concept (as disclosed with the present invention) has never been reported. In order to get more freedom for relatively fast compositional changes the usual method used is to prepare powder blends. This means that the composition of each blend is determined once the blend is produced; in order to change the composition, a new blend has to be prepared.

Furthermore, in the state of the art, the powder needs to be changed in the powder feeders, leading to a loss of time, a loss of powder and a lack of flexibility. Powder blends have the disadvantage of de-mixing; they can usually only be used when the different powders have a similar density and particle size distribution; and their preparation is time consuming. This means that many combinations of different materials (metallic and ceramic) or powder with different size distributions (finer powder with a powder with larger particle sizes) can hardly be prepared as a blend. This is also one of the main reasons why multilayer coatings are used where each powder is sprayed separately.

When a coating is sprayed, usually 2 (in HVOF systems, as disclosed for example in document EP 1 816 229 A1 or EP 1 942 387 A1) up to 4 (in certain APS systems) powder feeders are used. However, the current state of the art is to feed the same powder with same composition in all the powder feeders. Therefore, each time the coating composition shall to be changed the powder feeders need to be emptied, cleaned and filled with the new powder.

It would therefore be of great advantage to use separated powder feeders for each powder and perform a modular spraying, where the compositional changes can be programmed in a spraying program for the full component. On this way, a coating system could be sprayed at once without changes of powder or interruptions in the spraying process.

SUMMARY

It is an object of the present invention to provide a coating system for a component of a turbomachine, which is individually adapted to the locally varying requirements of the component with respect to thermal, chemical and mechanical stress.

It is another object of the present invention to provide a method for applying such a coating system to a component of a turbomachine, which avoids the disadvantages of the known methods, is more flexible in its application, reduces the coating time and efforts, and allows tailoring a coating on a turbomachine component to particular needs of the component as a whole or a section or local area of such a component in particular.

It is further object of the invention to provide a turbomachine component with an individually optimized coating.

These and other objects are obtained by a coating system according to claim 1, a method according to claim 9 and a component according to claim 24.

The inventive coating system for a component of a turbomachine comprises at least two different base powders, whereby each of said at least two different base powders has an individual desired distribution within said coating system, and wherein each of said at least two different base powders is responsible for a specific property of said coating system. The base powders are selected from the group of metallic materials, ceramics, MAX phases, metallic glasses, inorganic glasses, organic glasses, organic polymers or combinations thereof. The specific property is selected from the group of physical, mechanical, chemical, microstructural properties or combinations thereof.

According to an embodiment of the inventive coating system at least one of said at least two base powders is a powder blend of two or more different powders having one of a different size distribution, composition or particle shape.

According to another embodiment of the inventive coating system at least one of said at least two base powders contains particles, which are agglomerated and sintered.

According to just another embodiment of the inventive coating system at least one of said at least two base powders contains particles, which have a core/shell structure.

Specifically, said core of said particles is agglomerated and sintered.

Specifically, said core and shell or shells of said particles have different chemical compositions.

According to a further embodiment of the inventive coating system the fractions of the different base powders within the coating system vary with the depth of the coating system.

According to even another embodiment of the inventive coating system the fractions of the different base powders within the coating system vary along the coating system in lateral direction.

The inventive method for applying a coating system according to the invention is characterized in that at least two different base powders are simultaneously sprayed onto a surface of said component by means of thermal spraying, wherein the base powders are either completely or partially molten during thermal spraying.

According to an embodiment of the inventive method said at least two different base powders are simultaneously sprayed by means of one spraying gun, which is supplied with said at least two base powders through respective powder feeding means.

According to another embodiment of the inventive method said at least two base powders are fed to said spraying gun through separate powder lines.

According to a further embodiment of the inventive method said at least two base powders are brought together before being fed to a spraying gun through a single powder line.

According to another embodiment of the inventive method at least one of said at least two base powders is a powder blend of two or more different powders having one of a different size distribution, composition or particle shape.

According to just another embodiment of the inventive method at least one of said at least two base powders contains particles, which are agglomerated and sintered.

According to even another embodiment of the inventive method at least one of said at least two base powders contains particles with a core/shell structure, whereby said core and shell or shells have different chemical compositions.

According to another embodiment of the inventive method said spraying gun is moved relative to said surface of said component during spraying, and said powder feeding means are each separately controlled during said movement of said spraying gun.

Specifically, each powder feeding means has a controllable feeding rate, and said feeding rate of each powder feeding means is controlled and/or changed in order to tune the ratio of the different base powders used.

According to another embodiment of the inventive method said spraying gun is moved along said surface of said component during spraying, and said powder feeding means are each separately controlled during said movement of said spraying gun, in order to achieve different compositions of the resulting coating in different areas of said component surface.

According to just another embodiment of the inventive method said spraying gun is used to deposit by spraying on said surface of said component a coating system of increasing thickness, and said powder feeding means are each separately controlled during said deposition process, in order to achieve different compositions of the resulting coating in different depths of said coating system.

According to even another embodiment of the inventive method two or more components are coated one after the other, that each powder feeding means has a controllable feeding rate, and said feeding rate of each powder feeding means is controlled and/or changed when going from one component to another in order to change the ratio of the different base powders used.

According to another embodiment of the inventive method the at least two different base powders are chosen in terms of melting temperature, and the thermal power during thermal spraying is used to tailor the microstructure of the resulting coating by having some phases completely molten and some only partially molten during thermal spraying.

According to another embodiment of the inventive method the resulting coating system is subjected to a specific and individually tailored heat treatment in order to obtain the targeted microstructure and resulting coating properties.

Specifically, said heat treatment is done at temperatures between 600° C. and 1300° C., and with at least one holding time step between 1 and 48 hours.

The component for a turbomachine according to the invention comprises a substrate, which is coated on a surface with a coating system according to the invention.

BRIEF DESCRIPTION OF THE DRAWINGS

The present invention is now to be explained more closely by means of different embodiments and with reference to the attached drawings.

DETAILED DESCRIPTION

The invention describes a method to produce and apply modular coatings, where the coating properties can easily be modified from one component to another, locally on the component or even through the depth of the coating by combining several powders, each powder being responsible for one or more specific features of the final coating.

The use of flexible powder system(s) and a novel coating manufacturing method are the basis to reach the described purpose. This flexible coating method allows reaching individually tailored coating microstructure and correlated mechanical and/or physical properties of the coating.

The concept of modular coating according to the present invention is based on three main points:

- The use of different powders, each bringing a specific property to the final coating.
- The use of a composite powder concept, allowing an easier tuning of the powder composition, the size distribution and the spray ability of the powder.
- The use of a novel spraying method, wherein several powder feeders are used and each powder composing the coating can be fed and controlled independently from each other. Thereby the fraction of each powder can be tuned on-line during spraying, allowing the final coating composition and microstructure to answer very specific and local requirements on the parts.

Figure 1:
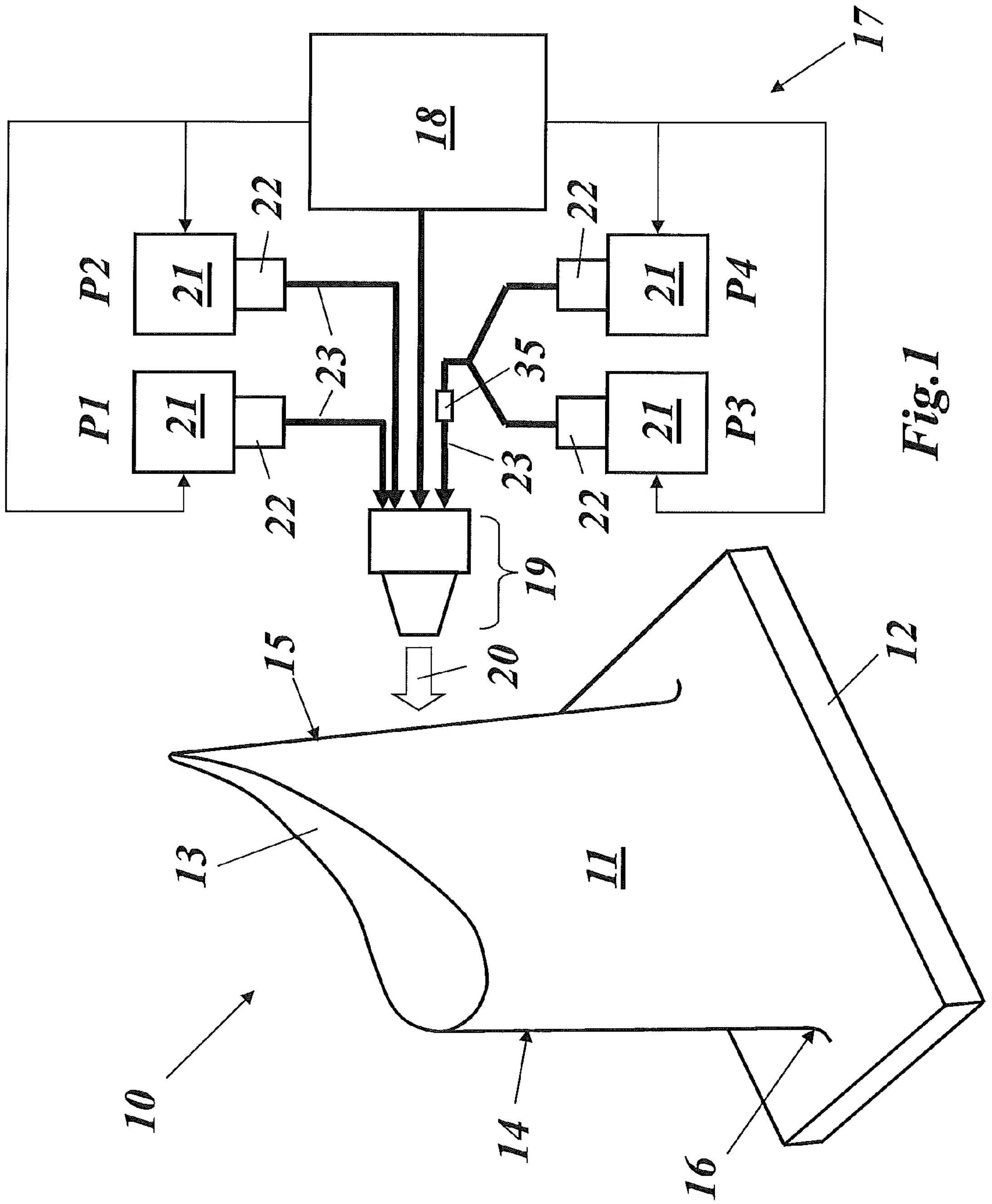
FIG. 1 shows in a simplified drawing a configuration for coating a turbine blade by thermal spraying according to an embodiment of the invention.

A possible configuration for a suitable powder coating systems is shown in FIG. 1. The component in this example is a blade 10 of a gas turbine, which has (in this case) a platform 12 and an airfoil 11 with a leading edge 14, a trailing edge 15 and a blade tip 13. Airfoil 11 makes a transition into the platform 12 in a transition region 16.

The thermal spraying of the powders is done by a spray coating system 17, which has a spraying gun 19 emitting a respective spray 20 directed on the surface to be coated. The spraying gun 19 is supplied with fuel and oxidizing media from a control unit 18, which media are necessary to generate a hot flame. Different powders P1, . . . , P4 are fed to the spraying gun 19 by means of individual powder feeders 21, 22 through powder lines 23. Each powder feeder 21, 22 comprises a respective powder reservoir 21 and a feeding device 22. The operation of the powder feeders 21, 22 and especially their feeding rates, are controlled by the control unit 18. The individual powders P1, . . . , P4 are fed to the spraying gun either separately, i.e. through separate powder lines 23 (powders P1 and P2 in FIG. 1), or are merged before reaching the spraying gun 19 (powders P3 and P4 in FIG. 1).

Figure 2:
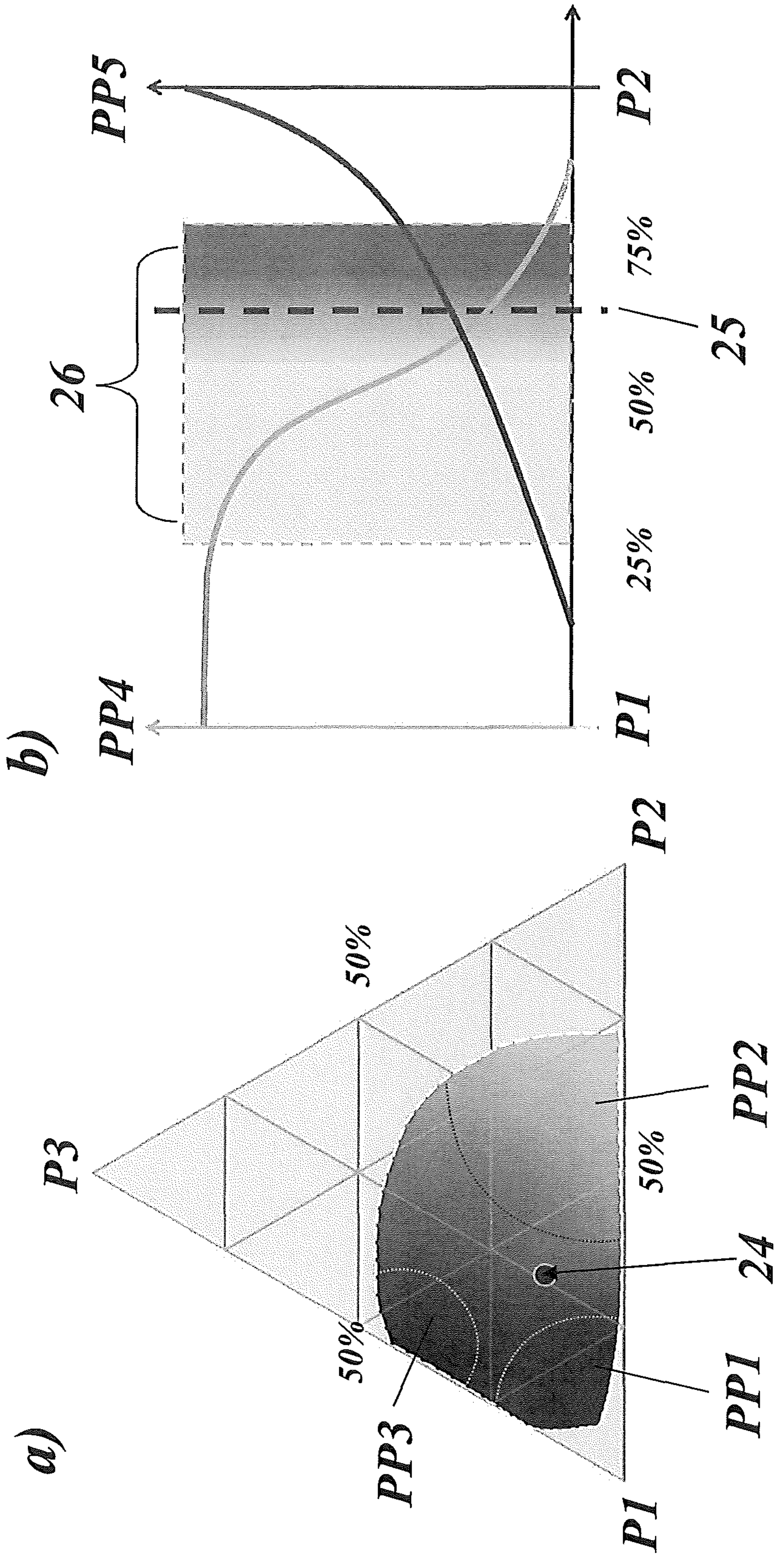
FIGS. 2*a-b* shows the variation certain properties of modular coating in a three-powder-system (FIG. 2*a*) and a two-powder-system (FIG. 2*b*)

At least two or more powders can be used in order to produce a modular composite coating according to the invention. Each powder brings to the coating specific physical and/or chemical properties, bringing in each specific feature for the final coating which can be adjusted by varying the fraction of each powder in the composite coating (see FIG. 2).

Examples of those physical properties are:

- Ductility
- Strength
- Oxidation/corrosion resistance
- Thermal conductivity
- Melting temperature Examples of mechanical and/or chemical properties of the resulting coating are:

- Erosion resistance
- Creep resistance
- TMF resistance (TMF=Thermal Mechanical Fatigue)
- LCF resistance (LCF=Low Cycle Fatigue)
- Chemical protection (sealing against contaminant)
- Wettability Examples of microstructural features are:

- Porosity of the coating
- Present phases and phase stability

In FIG. 2*a* an example of a composition versus properties (PP) chart of a coating using a mixture of three different powders (powder P1, powder P2 and powder P3) is presented. Each of these powders P1, . . . , P3 brings one (or multiple) specific property (properties) to the coating: property PP1, property PP2 and property PP3, respectively.

The composition of a conventional coating would appear on this diagram as a single point 24 (represented in FIG. 2*a* by a dot). Alternatively, the composition of the modular composite coating resulting from the modular spraying of these three powders P1, . . . , P3 will have an optimum region (delimited by a white dashed line in FIG. 2*a*), where the ratio of the different powders can be varied within a 3-dimensional space (3 base powders P1, P2, P3) in order to obtain the optimum combination of the properties PP1, PP2 and PP3, and which on this plot is represented as a restricted area in the overall area.

If one considers a modular coating with only two base powders (P1, P2) the compositional changes will be only two dimensional as presented in FIG. 2*b*. The visualization for a standard coating with single composition is represented in FIG. 2*b* by a dashed line 25 within the broader optimum modular coating composition range 26, which covers a full range of compositions and properties with the basic properties PP4 and PP5 of the two powders P1 and P2, respectively.

It is clear that the compositional dimensions will increase with the number of base powders used for the modular composite coating.

The different powder fractions P1, . . . , P4 composing a modular composite coating according to the invention can have different chemical composition, size distribution, powder grain shape.

The different powders fractions can be:

Metallic

Ceramic

MAX phase (MAX Phases are layered, hexagonal carbides and nitrides having the general formula $M_{n+1}AX_n$,)

Metallic glass

Inorganic glass

Organic polymers

A combination of the previously mentioned materials

Figure 3:
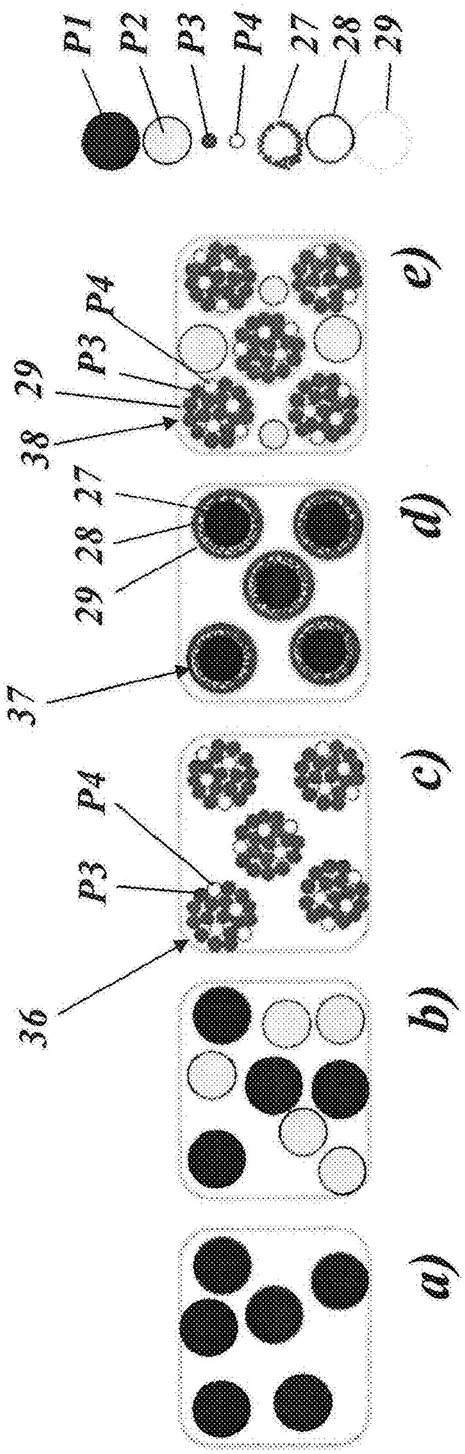
FIGS. 3*a-e* shows different powder fractions that can be used as base powder for a modular composite coating according to various embodiments of the invention.

Each individual powder fraction P1, . . . , P4 can either contain powder particles with a similar composition and size distribution, as shown in FIG. 3*a*, or can be made of a composite powder fraction as displayed in FIG. 3*b-e*.

The different powders P1, . . . , P4 can also have a flexible composition (also core/shell structure), particle shape and particle size distribution through the use of a composite powder concept.

The final powder system can be:

simple powder blend of two or more different powders having different size distribution, composition or particle shape. An example of such a powder is given in FIG. 3*b* with powder particles P1 and P2.

A mixture of two or more different powders having different size distribution, composition or particle shape, which are agglomerated and sintered and eventually covered by a shell structure. An example this type of composite powder with agglomerated and sintered powder particles P3 and P4 is given in FIG. 3*c*.

A core/shell structure with the core and the shell(s) 27, 28, 29 having different chemical compositions as illustrated in FIG. 3*d*.

A composition of the above mentioned powders, for instance the agglomeration and sintering of 2 or more powders covered by one or a plurality of shells. This powder can also be blend with other powders. A schematic view of such a powder with particles 38 is displayed in FIG. 3*e*.

The composition of the flexible powder is tailored by changing the fraction of each single powder in the composite particles. The particle size of the flexible powder is tuned by changing the size of agglomerates before sintering the individual fractions to reach composite particles. Certain properties such as diffusion of the core, strength, etc. can be adapted by changing the core/shell structure, shell(s) thickness and shell(s) composition.

The modular spraying concept consists in using separated powder feeders (21, 22 in FIG. 1) for each single powder (P1, . . . , P4) instead of using a powder blend. This allows tuning the properties of the coating while spraying continuously. The composition of each powder P1, . . . , P4 is constant and the change of feeding rate of the powders P1, . . . , P4 results in a compositional change of the final coating.

The modular spraying concept can be used for various known thermal spraying methods, i.e. HVOF (High Velocity Oxy Fuel), VPS (Vacuum Plasma Spray), APS (Air Plasma Spray), SPS (Suspension Plasma Spray), flame spray, etc.

The feeding rate of each powder P1, . . . , P4 is changed online in order to tune the fraction of each powder in the X-Y plane (i.e. specific to different areas of the component) or in Z direction (i.e., dependent of the depth of the coating), or with a combination thereof. This allows producing compositional changes:

From component to component, when a plurality of components is coated

Locally on each component

Through the coating thickness

Compositional gradients or multilayer coating can also be produced using this method.

Figure 5:
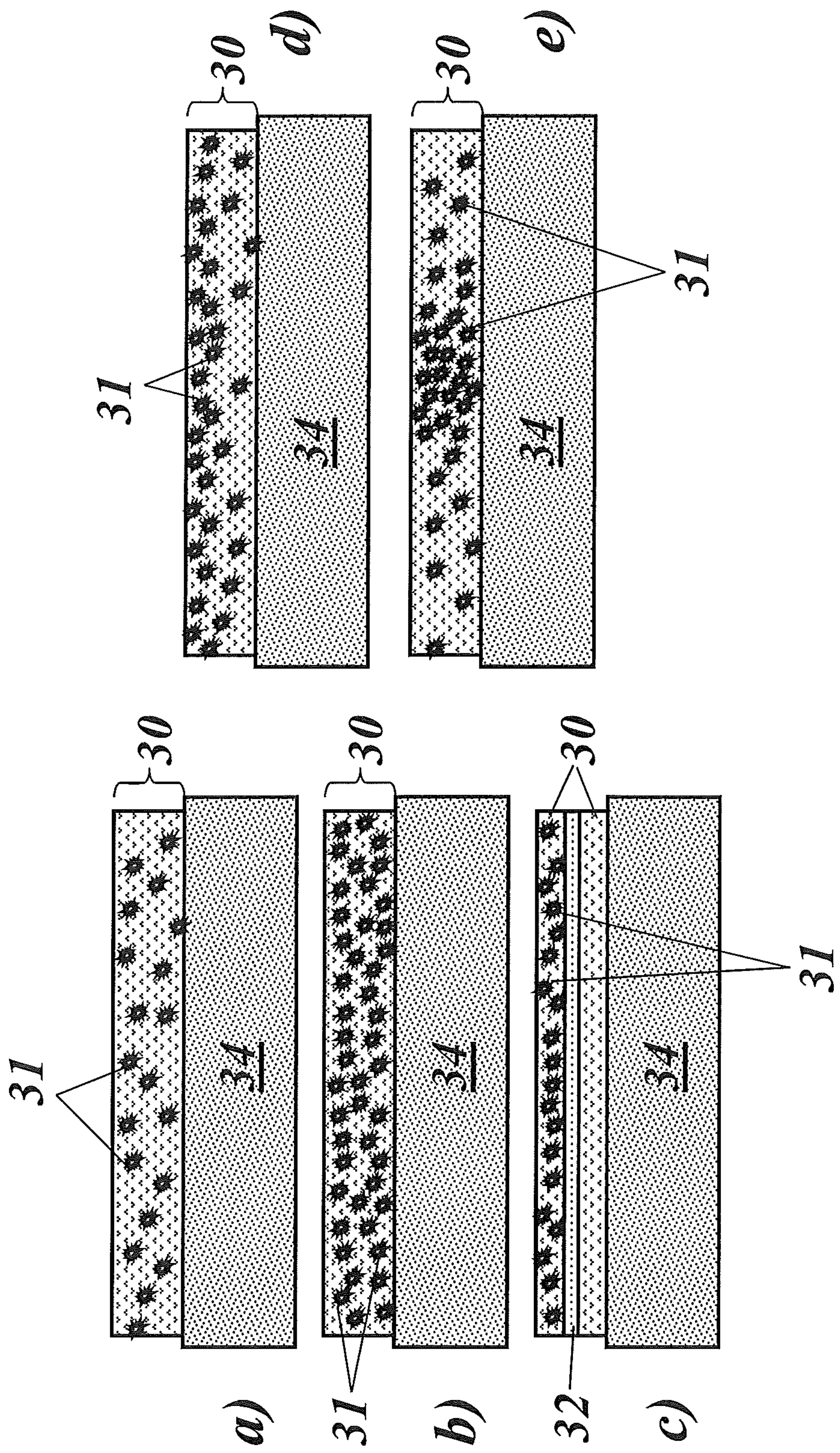
FIG. 5*a-e* shows various examples of modular composite coatings using three different base powders.

Examples of different possibilities of coating are presented in FIG. 5 for three different powders 30, 31, 32.

All these changes can be performed on-line, with the following advantages:

A large flexibility of coating properties using the same base powders.

No need of different pre-mixed powder blends.

No de-mixing of powder blends during process.

No interruptions of coating process for a change of composition.

No spraying equipment maintenance when compositional changes are performed.

The possibility to spray powders (with same and/or different composition) with different size distributions.

The possibility to spray powders (with same and/or different composition) with different densities.

The possibility to spray powder which cannot be blended.

The modular concept according to the invention also allows reaching a targeted microstructure of the coating by the combination of specific thermal spraying and heat treatment. The design of each powder fraction P1, . . . , P4 in term of melting point and the setting of the thermal power of the spraying gun 19 gives the possibility to determine if a complete or partial melting of each powder fraction P1, . . . , P4 is taking place in the flame. This makes it possible to tune the final shape of each phase in the coating (either round or lamellar).

Figure 4:
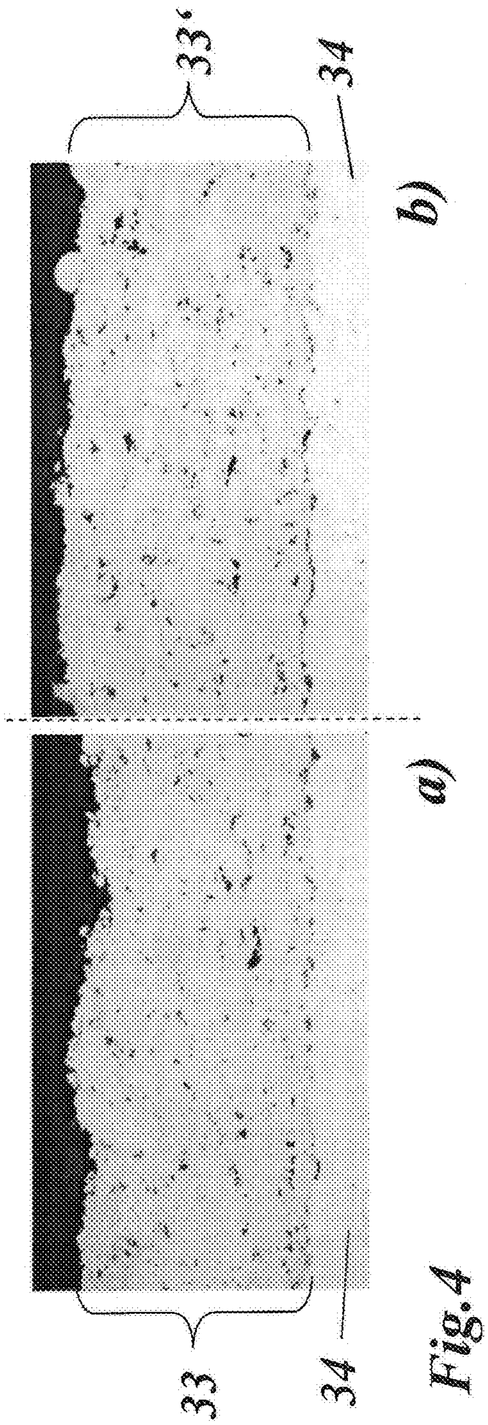
FIGS. 4*a-b* shows actual photographs of a modular composite coating according to an embodiment of the invention using a HVOF system with two powder feeders (one for each powder) with a phase ratio of 20%/80% (FIG. 4*a*) and a phase ration of 50%150% (FIG. 4*b*)

An example of a modular composite microstructure is displayed in FIG. 4. Two different powders have been used for the modular coating on a substrate 34, and in FIG. 4*a* one can see the resulting microstructure of the coating 33 for a ratio 10%/90%, and in FIG. 4_b_ one can see the resulting microstructure of the coating 33' for a ratio 50%/50%. The two coatings 33 and 33' have been sprayed using an HVOF gun with two powder feeders, one for each powder.

A specific and individually tailored heat treatment can also be used in order to obtain the targeted microstructure and resulting coating properties. The lamellar structure of the coatings presented in FIG. 4 can also be changed, depending on the heat treatment used. Heat treatments at high temperature (600° C. to 1300° C.) with large holding time steps (1 to 48 hours) lead to more homogeneous compositions.

In kerosene fired 3rd generation HVOF systems, the powder is usually injected in radial direction into the flue gas by two injectors. The injectors are placed after the nozzle but before the barrel of the burner at an azimuth of Δ180°. In the modular coating concept according to the invention, n>2 injectors are used for powder injection. The arrangement of the n>2 injectors is arbitrary but preferably in Cn space group with respect to the axial direction.

Optionally, each injector can be connected to two powder lines by a Y-connection (see the powder feeders for P3 and P4 in FIG. 1). In this case, the total carrier gas flow (typically in the range of 6-9 l per min per injector) is evenly distributed to its powder lines 23 (resulting in about 3 to 4.5 l per min per powder line 23, which is in agreement with common minimum carrier gas flow requirements).

Each powder line 23 is connected to a powder feeder 21, 22, whereas each powder feeder 21, 22 can have its own powder type P1, . . . , P4. The feed rate of each powder feeder 21, 22 is set modular according to the coating requirements by a robot program as parameter (control unit 18). Adjusting the composition of the coating layer requires consideration of powder type dependent deposition efficiency. If possible, the total powder feed rate should be kept constant.

Improved pre-mixing of the two different powders of each powder injector can be achieved by an intermediate injector pipe (between the Y-connection and the final injection into the flue gas. With this configuration, the composition of the coating can be adjusted modularly according to requirements. Application of multilayer coatings, whereas for each layer an adjustment of the receipt parameter is done, enables the application of coating gradients or alternating multilayer coatings.

Similar approaches can be applied to HVOF systems having axial powder injection (such as 3rd generation gas fired, 1st and 2nd generation HVOF systems). Optionally, pre-mixing of all applied powders can be achieved by an intermediate powder pipe (35 in FIG. 1) between the connection and the final injection into the burning chamber.

Similar modular approaches can be applied to different thermal spray techniques such as APS, VPS and SPS. Here, the powder is usually injected into the free plasma plume outside the burner. The arrangement of the n>2 injectors is according Cn space group with respect to the axial direction. Optionally, each injector can be connected to two powder feeders by a Y-connection, as explained before. The feed rate of each powder feeder 21, 22 is set modular according to the coating requirements by the robot program as parameter. Adjusting the composition of the coating layer requires consideration of powder type dependent deposition efficiency. If possible, the total powder feed rate should be kept constant.

Example 1: Composite Coating with Modular Ductility and Oxidation/Corrosion Resistance The first blade of a GT is prone to inhomogeneous temperatures and loads at different locations. Local hot spot and regions subjected to cycling loading are present on the blades. A typical case is that the trailing edge of a blade (15 in FIG. 1) can be a local hot spot and the leading edge (14 in FIG. 1) is more prone to cyclic fatigue. This blade would need a coating bringing an improved cyclic resistance at the leading edge and enhanced oxidation resistance at the trailing edge. A modular composite coating according to the invention could be sprayed with different powder ratios at different locations for this purpose.

Example 2

The second example is a blade which is experiencing strong cyclic loading. This blade needs an improved cyclic resistance but also keep its oxidation/corrosion resistance. The weak link for cyclic resistance is usually the overlay coating for protection against oxidation and corrosion. Due to thermal gradient in the coating during transient operation this one is prone to crack formation and propagation in the base material. For instance, when the component is cooled down, high tensile stresses are formed in the coating surface, leading to crack initiation. In order to hinder this crack formation, a modular coating according to the invention can be used.

Example 3

The third example concerns a component situated in the hot gas path of a turbo machine. This component or part of this component is produced using selective laser melting (SLM) technology. Due to the microstructural differences between cast material and SLM produced material, the latter shows exceptional LCF properties; however it is prone to increased diffusion mechanisms through the increased volume of grain boundaries. The particularly increased $O_2$, Al and Cr diffusion is leading to reduced oxidation resistance compared to its cast counterpart.

A larger interdiffusion rate between metallic overlay coatings and the SLM made substrate material will also take place. The stronger diffusion rate from the metallic coating within the SLM material leads to faster consumption of the overall Al- and Cr-content within the metallic coating, reducing globally the oxidation resistance of the coating system.

In order to preserve the high LCF performances of the SLM made material, its microstructure should be sustained and combined with an improved oxidation resistant metallic overlay coating.

If the SLM made material forms only a section of the component, a modular coating according to this invention shall preferentially be used, in order to provide locally (adjacent to the region made of SLM material) an improved oxidation resistance and herewith an enhanced overall coating/part lifetime. In order to control the diffusion mechanisms between the coating and the SLM material, a compositional gradient can be created throughout the thickness of the coating using a modular coating as described within this invention.

The coating for the three previously mentioned examples would be made of the combination of three different powders:

A standard overlay powder which can be MCrAlY, where M can be Fe, Ni, Co, or combination of thereof.

A powder with increased ductility.

A powder with improved oxidation resistance.

Examples of a substrate 34 with modular composite coatings using up to three different base powders 30, 31 and 32 are shown in FIG. 5.

FIG. 5*a* and FIG. 5*b* show coatings with two different compositions or ratios of base powders 30 and 31, whereby the coating in FIG. 5*b* has a higher fraction of base powder 31.

FIG. 5*c* shows a layered coating with a layer of pure base powder 30, an intermediate layer of pure base powder 32 and an upper composite layer with base powders 30 and 31.

FIG. 5*d* shows a coating with two base powders 30 and 31, and a gradient of base powder 31 along the depth of the coating layer (Z direction).

FIG. 5*e* shows a coating with two base powders 30 and 31, and a gradient of base powder 31 in the position on the component (in the X-Y plane).

The coating is applied through thermal spraying and the ratio of the three different powders in the coating is tuned on-line thanks to the use of separated powder feeders. With a larger amount of oxidation resistant phase (as schematically shown in FIG. 5*b*) the coating will have a larger oxidation resistance over time. With a larger ratio of ductile phase (as shown in FIG. 5*a*) the coating will have a larger resistance to cyclic fatigue, crack formation and crack propagation. The feeding rate of each powder feeder is set in order to obtain the targeted coating composition. This method also allows having local changes of the coating composition locally on a component, and makes it possible to tune the composition while thermal spraying as shown in FIG. 5*c-e*.

In order to achieve a coating with variable properties in the leading and trailing edge in accordance with Example 1, shown above, a modular spraying is used. When spraying the component, the quantity of oxidation resistant phase will be increased by increasing the feeding rate once the gun is spraying the trailing edge. When spraying the leading edge the feeding rate of the ductile phase is increased in order to increase the ductility of the leading edge. The same procedure will be additionally used for Example 3, where the quantity of oxidation resistant phase will also be increased in the regions made with SLM material for combined improvement of oxidation and LCF resistance.

In order to achieve the cycling resistance of the coating in accordance with Example 2, shown above, one has to make sure that the overlay coating for oxidation/corrosion resistance is not the one leading to a crack initiation. It is therefore needed that the coating has an improved ductility at its surface without decreasing the oxidation resistance of the coating. Therefore, a graded coating is produced in the thickness. The ductility of the coating is improved in the surface of the coating by adding more ductile phase and the oxidation resistance is increased close to the surface of the base material by adding oxidation resistant phase. During service, the surface of the coating is more resistance to crack formation and therefore improves the cycling life of the component, while the reservoir phase account for the lifetime of the coating and will provide a reservoir for oxidation/corrosion resistance slowly diffusing from the bottom to the top of the coating.

A compositionally graded coating can also be used for the purpose of Example 3. An increased amount of oxidation resistant phases, especially at the interface coating/SLM made base material will account for an improved oxidation resistance of the SLM made material by improving the long term oxidation protection of the metallic coating. Oxidation protective elements diffusing into the SLM material will be compensated by the reservoir, keeping a minimum level in the overlay coating and improving at the same time in the near SLM material surface the base material oxidation resistance. Similarly as for Example 2, the ductility of the coating is improved in the surface of the coating by adding more ductile phases, in order to keep the advantage of the improved LCF lifetime of SLM material and avoiding crack initiation at the coating surface resulting from cyclic operation.

The present invention has the following characteristic features and advantages:

- The innovation comprises having a modular composite coating, wherein each powder fraction of a plurality of different powders enhances a certain property in the overall coating.
- The flexibility of changing the fraction of each powder in the coating in order to tune the properties of the final coating system.
- The coating does not have a fixed composition, but has multidimensional possibilities for tuning the final coating properties.
- Using a separate powder feeder for each of the powders composing the coating gives the possibility to change very fast and in a very flexible way the coating composition. This methods especially allows an online variation of composition while thermal spraying.
- A special advantage is the use of composite powders, wherein the composition of the powder can be tailored by changing the components or the design of the powder particles (core shell structure, powder blend, agglomerated and sintered powders).
- The use of a powder made of a composite sintered core, being optionally surrounded by a shell, is possible. The core is made of fine powders which are agglomerated and sintered. The composition of the core can be changed without changing the composition of the initial fine powders. The particle size (i.e. the size of the sintered core) can be changed in order to optimize the spraying of the powder.
- The modular concept guarantees that the "concentration" of each of a plurality of properties can be varied from one component to another, namely locally on the component or within the coating depth in order to tune the local properties depending on the boundary conditions. Gradient of concentration or multilayered coatings are also within the scope of this invention.
- With the right choice and design of each powder fraction in terms of melting temperature and the adaptation of the thermal power of the spraying gun one can tailor the microstructure by having some phases completely molten and some only partially molten during thermal spraying.

The invention claimed is:

1. A coating system for a component of a turbomachine, comprising:

- a first powder feeder configured to feed a first composite powder to a sprayer via a first line for applying the first composite powder onto the surface of the component;
- a second powder feeder configured to feed a second composite powder to the sprayer via a second line for applying the second composite powder onto the surface of the component, the second composite powder having a composition that differs from a composition of the first composite powder;
- wherein the first powder feeder and second powder feeder are configured such that oxidizing media, fuel, the first composite powder and the second composite powder are simultaneously feedable onto the surface of the component to deposit the coating on the surface of the component such that a first portion of the coating covering a first portion of the surface adjacent a leading edge of the component has a first composition and a second portion of the coating covering a second portion of the surface adjacent a trailing edge of the component has a second composition via adjustment of a ratio between the first composite powder and second composite powder fed to the sprayer controlled during feeding of the multiple different powders, fuel, and oxidizing media onto the surface of the component;

the first powder feeder and the second powder feeder configured to be controlled such that the first composition has a greater proportion of the first composite powder than the second composition such that the first portion of the coating has a greater ductility than the second portion of the coating and the second portion of the coating has a greater oxidation resistance than the first portion of the coating;

a source of the first composite powder that is connected to the sprayer via the first line such that the first composite powder is passable to the first powder feeder to feed the first composite powder onto the surface of the component via the sprayer, wherein said first composite powder is a powder blend of two or more different powders having one of a different size distribution, composition and particle shape; and a source of the second composite powder that is connected to the sprayer via the second line such that the second composite powder is passable to the sprayer to feed the second composite powder onto the surface of the component via the sprayer, wherein said second composite powder is a powder blend of two or more different powders having one of a different size distribution, composition and particle shape.

2. The coating system as claimed in claim 1, wherein at least one of said first composite powder and said second composite powder contains particles, which are agglomerated and sintered.

3. The coating system as claimed in claim 1, wherein at least one of said first composite powder and said second composite powder contains particles, the particles having at least one of a core structure and a shell structure.

4. The coating system as claimed in claim 3, wherein said core of said particles is agglomerated and sintered.

5. The coating system as claimed in claim 3, wherein said core of said particles has at least one chemical composition that differs from a chemical composition of said shell of said particles.

6. The coating system as claimed in claim 1, wherein the first and second composite powders are configured to be feedable such that fractions of the first and second composite powders vary along a depth and a length of the coating.

7. The coating system as claimed in claim 1, wherein the first and second composite powders are configured to be feedable such that fractions of the first and second composite powders vary along a lateral direction of the coating.

* * * * *